United States Patent [19]

Knothe et al.

[11] Patent Number: 4,640,745

[45] Date of Patent: Feb. 3, 1987

[54] PROCESS FOR PRODUCING A CUTTING BASE

[75] Inventors: Herbert Knothe, Neumünster; Klaus Röschmann, Schülp, both of Fed. Rep. of Germany

[73] Assignee: Teldec Schallplatten GmbH, Hamburg, Fed. Rep. of Germany

[21] Appl. No.: 767,285

[22] PCT Filed: Nov. 22, 1984

[86] PCT No.: PCT/EP84/00365

§ 371 Date: Sep. 9, 1985

§ 102(e) Date: Sep. 9, 1985

[87] PCT Pub. No.: WO85/02420

PCT Pub. Date: Jun. 6, 1985

[30] Foreign Application Priority Data

Nov. 23, 1983 [DE] Fed. Rep. of Germany ....... 3342286

[51] Int. Cl.$^4$ .............................................. C25D 1/10
[52] U.S. Cl. ........................................................ 204/5
[58] Field of Search ............................................. 204/5

[56] References Cited

U.S. PATENT DOCUMENTS 4,512,007 4/1985 Knothe .................................... 204/5

Primary Examiner—T. M. Tufariello
Attorney, Agent, or Firm—Spencer & Frank

[57] ABSTRACT

Process for producing a sound recording cutting base, which includes precipitating a cuttable copper layer on a substrate from an electroplating bath, the copper layer having an initial grain size and having recrystallizing characteristics as a result of the bath's composition, convection and current density, characterized in that in order to extend recrystallization time, substances are added to the bath which, by their incorporation in the copper layer, stabilize the latter in such a manner that recrystallization is prevented or delayed, the substances including leveling agents added in effective amounts to prevent formation of layer-grain crystals of copper having a grain size which substantially exceeds the initial grain-size.

15 Claims, No Drawings

PROCESS FOR PRODUCING A CUTTING BASE

BACKGROUND OF THE INVENTION

1. Field of the Invention

The invention relates to a process for producing a cutting base and, in particular, to a process for producing a cutting base intended particularly for sound recordings and including a cuttable copper layer precipitated on a substrate, with the copper layer having recrystallizing characteristics as a result of the composition of the bath, the convection and the current density in the electroplating bath.

2. Background of the Art

It is known according to German Pat. No. (DE-PS) 2,811,888 and German Laid-Open Patent Application No. (DE-OS) 3,114,131 to produce video and audio records by providing metal substrates with groove modulations. To do this, a thin coating of copper is initially applied onto a substrate of aluminum, stainless steel or the like by electroplating from a copper bath and the groove modulation is then cut electromechanically into the copper layer by means of a cutting stylus which is guided over the metal substrate.

The electroplating bath here has such dimensions that the copper layer has a Vickers hardness between 110 and 300, since optimum cuttability has resulted in this hardness range. Softer copper of a hardness of, for example, 90 HV, results in smudged recordings, while harder copper has too high a resistance to cutting. Greater hardness of the precipitated copper is attained particularly by organic baths including components such as brightener additives.

In the known process, the brightener additives and bath conditions are dimensioned to result in a hardness range of from 160 to 220 HV. This causes recrystallizable copper to be precipitated; i.e., copper which is in an unstable phase. The range of hardness of this unstable phase of the copper extends from an initial hardness predetermined by the bath to a minimum hardness value which is practically independent of the bath. In this hardness range, the copper attains optimum hardness while simultaneously being ductile and has metal removal characteristics which are a prerequisite for good cutting behavior. If during cutting of the groove modulation in such a copper cutting base, the cutting stylus is guided over the metal surface at a setting angle which is predetermined for the respective copper consistency and the desired cutting depth and which lies, for example, between 10° and 20°, the known process results in a copper master which, for sound recordings, is clearly superior to the conventional master in the form of a lacquer recording.

It has been found that, compared to a lacquer recording, not only are there less rejects produced, but the quality of the recording is additionally improved, for example, the signal to noise ratio by about 10 dB. Moreover, phonograph records produced according to the copper cutting technique have no leading or trailing echoes which could not be avoided in the conventional lacquer recordings. Additionally, bubbles, air inclusions, shrinkage cavities or the like are practically eliminated. The production of metal positives or negatives, such as, for example, matrixes for the production of the final record carriers, no longer requires complicated silver plating. The cut record carrier (master) can be stored indefinitely and further copies can be made at any time.

However, it has been found that in the above-described process the recrystallization phase required for quality and feasibility of the cutting process employing copper precipitated on a substrate is still limited in time. This time limitation prevents such uncut copper cutting bases from being stored as desired and thus causes difficulties in studio operations because the cuttability time of the copper cutting bases after their production by electroplating is relatively short. Although the duration of the recrystallization phase has been extended by cooling of the copper cutting bases, this measure is not always sufficient.

SUMMARY OF THE INVENTION

It is the object of the invention to extend the cuttability time of such copper cutting bases by other and possibly additional measures than cooling.

This is accomplished by adding substances to the bath which, by their incorporation in the Cu structure, stabilize the latter in such a manner that recrystallization is prevented or delayed. Modifications of the invention include adding organic substances to the bath which, by their incorporation in the precipitate, result in no or only a slight increase in hardness, but delay recrystallization or adding inorganic substances whose precipitation potentials are adapted to the copper in such a way that only slight quantities of these elements are precipitated. Arsenic and/or bismuth, antimony may be additionally mixed in. Preferably, only such small quantities are added to the bath that these elements are so finely distributed within the copper structure that they are unable to form their own crystal lattice.

DESCRIPTION OF THE PREFERRED EMBODIMENTS

In principle, the problem of extending the cuttability time is solved in that substances are added to the electroplating bath which substances, although incorporated in the precipitate, do not act as grain refiners or hardeners. The type and quantity of the additives on which the present invention is based influence predominantly the recrystallization behavior and not the hardness.

The brightener additive is primarily responsible for the hardness of the precipitates and also serves to set a hardness which is optimum for the cutting process.

It has been found to be of advantage to add substances to the bath which simultaneously produce a levelling effect in the precipitate (so-called organic type levelling agents). These levelling agents are firmly incorporated in the copper structure and prevent formation of large-grain crystallites.

Additionally it is possible to interfere with mobility in the copper structure by incorporating arsenic, antimony and bismuth so that the formation of larger crystallites, which is synonymous with recrystallization, is likewise prevented. Also, the behavior of these elements with respect to the copper atoms which tend to migrate is significantly more stable than that of the organic bath additives. They are neither migrated around nor penetrated as are the organic bath additives.

For an electroplating bath for the production of a cutting base provided with recrystallizable copper, the composition disclosed in German Laid-Open Patent Application No. (DE-OS) 3,114,131 has been found to be satisfactory.

The suggestions made there are also applicable for the process described here. Additionally, the following is added to the bath, for example:

0.05–0.5 ml/l N,N-phenylmethylcarbamide methylene diethyl dithiocarbamine ($C_{15}$ $H_2$ 3N 353) molecular weight 341

0.1–1 ml/l dyestuffs containing cationic N compounds.

These additives produce an extension of the recrystallization time from 20 minutes to 7 hours (measured at 100° C.) with unchanging hardness or a slight increase in hardness, respectively. If the amount of additives (levelling agents) are increased further, precipitates can be produced which no longer recrystallize. It has also been found that additions of, for example, 50–200 ml/l antimony flouride produce an extension of the recrystallization time. The same applies for bismuth and arsenic.

What is claimed is:

1. Process for producing a sound recording cutting base, comprising:
   precipitating a cuttable copper layer on a substrate from an electroplating bath, the copper layer having an initial grain size and having recrystallizing characteristics as a result of the bath's composition, convection and current density, characterized in that in order to extend recrystallization time, substances are added to the bath which, by their incorporation in the copper layer, stabilize the latter in such a manner that recrystallization is prevented or delayed, said substances including leveling agents added in effective amounts to prevent formation of large-grain crystals of copper having a grain size which substantially exceeds the initial grain-size.

2. Process according to claim 1, wherein the leveling agents added to the bath are organic substances which, by their incorporation in the copper layer, influence predominantly recrystallization behavior and not copper layer hardness.

3. Process according to claim 1, wherein the substances added to the bath further include inorganic substances having precipitation potentials adapted to that for copper in such a way that substantially smaller quantities of these inorganic substances are precipitated compared to the quantity of copper.

4. Process according to claim 1, wherein the substances added to the bath further include one or more of arsenic, bismuth, and antimony.

5. Process according to claim 1, wherein said leveling agents are added to the bath in amounts ranging from an amount effective to extend the recrystallization time to an amount sufficiently small to effectively prevent hardening of the copper layer under the conditions of the process.

6. Process according to claim 1, wherein said leveling agents are added to the bath in amounts ranging from 0.15 to 1.5 milliliters per liter of bath.

7. Process according to claim 1, wherein said leveling agents comprise from 0.05 to 0.5 milliliters per liter of bath of N,N-phenylmethylcarbamide methylene diethyl dithiocarbamine and from 0.1 to 1 milliliters per liter of bath of dyestuffs containing cationic N compounds.

8. In a process for producing copper cutting plates having a characteristic cuttability time for sound recording including the steps of providing an electroplatable substrate and a copper electroplating bath, the bath having a composition, a convection characteristic, and a current density; and electrolytically precipitating a cuttable copper layer onto the substrate, the copper layer having recrystallization characteristics which are a function of the composition, the convection characteristic, and the current density of the bath, which recrystallization characteristics include a recrystallization time during which the copper layer recrystallizes from an initial, newly precipitated state having an initial crystal grain size to a second state having a second crystal grain size, which second grain size is substantially larger than the initial grain size, the improvement comprising:
   adding organic leveling agents to the bath, which organic leveling agents are incorporated into the copper layer during the electrolytic precipitation thereof, in amounts effective to extend the recrystallization time by at least delaying recrystallization to the second state whereby the characteristic cuttability time of the copper cutting plates is increased.

9. The process according to claim 8, wherein said leveling agents are added to the bath in amounts ranging from 0.15 to 1.5 milliliters per liter of bath.

10. The process according to claim 8, wherein said leveling agents are added to the bath in amounts ranging from 0.05 to 0.5 milliliters per liter of bath of N,N-phenylmethylcarbamide methylene diethyl dithiocarbamine and from 0.1 to 1 milliliters per liter of bath of dyestuffs containing cationic N compounds.

11. The process according to claim 8, wherein inorganic substances are additionally added to the bath, the inorganic substances having precipitation potentials adapted to that for copper so that a substantially smaller quantity of same are precipitated compared to the quantity of copper during the electrolytic precipitation step.

12. The process according to claim 11, wherein the inorganic substances added to the bath are selected from among arsenic, bismuth, antimony, and mixtures thereof.

13. The process according to claim 8, wherein the organic leveling agents are added to the bath in amounts effective to at least delay recrystallization to the second state without substantially hardening the copper layer.

14. The process according to claim 8, wherein the organic leveling agents are added to the bath in amounts ranging from an amount effective to extend the recrystallization time to an amount sufficiently small to effectively prevent hardening of the copper layer.

15. The process according to claim 8, wherein the bath further comprises from 50 to 200 milligrams per liter of antimony fluoride.

* * * * *